3,040,039
NEW 18-OXYGENATED STEROIDS AND PROCESS FOR THEIR MANUFACTURE
Albert Wettstein, Karl Heusler, and Peter Wieland, Basel, Switzerland, assignors to Ciba Corporation, a corporation of Delaware
No Drawing. Filed July 13, 1959, Ser. No. 826,463
Claims priority, application Switzerland July 25, 1958
20 Claims. (Cl. 260—239.55)

The present invention provides androstane compounds oxygenated in the 11- and 18-positions and functional derivative thereof. The new androstane compounds, more especially the derivatives of testosterone, are distinguished by valuable biological effects. Compared with their androgenic action their anabolic action is much more pronounced. By virtue of this very favourable relationship between their anabolic and androgenic effects the products of the present process can be used for treating all pathological conditions that require an intensified protein synthesis, for example in cases of underweight, in post-operative and post-infection cases, or for treating asthenia. The new compounds may also be used in the manufacture of further steroids oxygenated in the 18-position.

The new androstane compounds dioxygenated in the 11:18-position are obtained by treating an 11:18-dioxygenated 17α:20-dihydroxy-pregnane compound with an agent capable of splitting glycols and reducing any oxo groups contained in the 11-, 17- and/or 18-positions of the resulting compound and/or oxidising, etherifying or esterifying any hydroxyl groups in their 11β-, 17- and/or 18-positions and/or liberating any protected oxo groups.

The glycol cleavage according to the present process in the specified 17α-20-diols is performed by as such known methods, for example with a lead tetraacylate such as lead tetraacetate, or with periodic acid or a periodate. In the case of the 18:20-hemiketals obtained from 17α:18-dihydroxy-20-oxo-pregnanes, the cleavage can be achieved also with manganese dioxide. The reaction is carried out with the use of a solvent which is inert to the oxidant used, for example glacial acetic acid, dioxane, methanol, ethanol or—when the oxidant used is manganese dioxide—chloroform.

The 17-oxo group in a 17-ketone resulting from the glycol cleavage can then be reduced; this can be achieved with the aid of a complex metal hydride, for example lithium-aluminium hydride, lithium-boron hydride, potassium-boron hydride or sodium-boron hydride, or else with catalytically activated hydrogen, for example with a noble metal catalyst such as platinum, in a hydroxyl-containing solvent such as alcohol, glacial acetic acid or the like. In an analogous manner a free oxo group, for example in the 11- or 18-position, can be reduced. When the 17-ketone obtained by the glycol cleavage contains an (18→11) lactone group, the latter can be reduced together with the 17-keto group with the aid of lithium-aluminium hydride.

By suitably selecting the order of succession of the reactions it is possible to manufacture derivatives of 11β:17β:18-trihydroxy-androstanes in which the hydroxyl groups in the 17- and/or 18-positions are esterified. In this reaction the 11β-hydroxyl group, which is difficult to esterify, remains unaffected. When, for example, an 11β:17α:18:20-tetrahydroxy-pregnane is degraded with lead tetraacetate to the 17-ketone which is then treated with an acylating agent, an 11-β-hydroxy-18-acyloxy-17-oxo-androstane results whose 17-oxo group can be reduced to the hydroxyl group with a calculated amount of sodium-boron hydride. The 11β:17β-dihydroxy-18-acyloxy-derivative obtained in this manner can be rearranged to an 11β:18-dihydroxy-17β-acyloxy-androstane by treatment with a base or an acid. The 17- and 18-monoacylate can be esterified to yield the 11β-hydroxy-17β:18-diacyloxy-androstane by further treatment with an acylating agent.

The esterifications according to the present process are carried out with reactive derivatives, more especially acid halides or anhydrides, of the under-mentioned acids; the acid acceptor used in the acylating operation is a tertiary base, for example pyridine or collidine or an alkali metal salt of the acid concerned. In this manner androstane compounds are obtained that contain in the 17- and/or 18-positions ester radicals, for example ester radicals of saturated or unsaturated aliphatic, cycloaliphatic, aromatic or heterocyclic carboxylic acids, preferably of lower aliphatic, monocyclic cycloaliphatic, aromatic or heterocyclic carboxylic acids, lower monocyclic araliphatic or cycloaliphatic carboxylic acids, such as for example of formic acid, acetic acid, chloroacetic acid, trifluoro-acetic acid, carbamic acids, alkoxycarboxylic acids, propionic acid, butyric acids, lactic acid, valeric acids such as n-valeric acid or trimethylacetic acid, diethylacetic acid caproic acids such as β-trimethylpropionic acid, oenanthic, caprylic, pelargonic, capric, undecylic acids such as undecylenic acid, lauric, myristic, palmitic or stearic acids such as oleic acid, crotonic acid, undecanoic acid, cyclopentyl-, cyclohexyl- or phenyl-acetic or -propionic acids, hexahydrobenzoic acid, benzoic acid, phenoxyalkanoic acids such as phenoxyacetic acid, para-chloro-phenoxyacetic acid, 2:4 - dichloro - phenoxy - acetic acid, 4 - tertiary butyl-phenoxy-acetic acid, 3-phenoxy-propionic acid, 4-phenoxy-butyric acid, furan-2-carboxylic acid, 5-tertiary butyl-furan-2-carboxylic acid, 5-bromo-furan-2-carboxylic acid, nicotinic, isonicotinic acid, furthermore of dicarboxylic acids such as oxalic, succinic, maleic, glutaric, dimethylglutaric, pimelic, acetonedicarboxylic, phthalic tetrahydrophthalic, hexahydrophthalic, endomethylenetetrahydrophthalic, endomethylenehexahydrophthalic, endoxyhexahydrophthalic, endoxytetrahydrophthalic acid, camphoric acid, cyclopropane-dicarboxylic acid cyclobutane-dicarboxylic acid, diglycolic acid, ethylene-bis-glycolic acid, polyethylene-bis-glycolic acids, quinolic, cinchomeronic acid, as well as the polyethylene glycol mono-alkyl ether semi-esters of the above dicarboxylic acids, of ketocarboxylic acids such as β-ketocarboxylic acids, for example of acetoacetic, propionyl-acetic, butyrylacetic or caprionylacetic acid, of amino acids such as diethylamino-acetic acid and the like.

If desired, the free, reactive hydroxyl group contained in the above-mentioned 17β- and 18-monoacyl compounds can be etherified. This can be achieved in the presence of an acid catalyst such as a mineral acid, boron trifluoride, zinc or ferric chloride or more especially pyridine hydrochloride. Etherification proceeds especially advantageously with dihydropyran or with trityl chloride in the presence of pyridine.

Any free hydroxyl groups contained in an 11:17:18-trioxygenated androstane obtained by the processes described above can be oxidised to oxo groups. Depending on the starting material and oxidant used this leads to 11β:17β-dihydroxy-18-oxo-, 11:17-dioxo-18-hydroxy-, 11:18-dioxo-17β-hydroxy-, 11β-hydroxy-17:18-dioxo-androstanes or to the corresponding esters or ethers thereof. When an 11β:17α:18:20-tetrahydroxypregnane is oxidised with lead tetraacetate, for example, the glycol cleavage is accompanied by dehydrogenation of the 18-hydroxyl group to the 18-oxo group. When an 11β:18-dihydroxy-17β-acetoxy-androstane is oxidised by the Oppenauer method, for example with aluminium tertiary butylate and cyclohexanone, an (18→11)-lactone of a 17-acetoxy-androstane-18-acid is obtained. Alternatively, such lactones can be prepared from the 11β-hydroxy-18-oxo compounds (present as hemiacetals) by oxidation with manganese dioxide. (18→11)-lactones are also formed when an 11β:17β:18-triol, which is etherified or esterified in the 17-position, is oxidised with chromium trioxide-pyridine complex, in addition to 11:18-dioxo-androstane compounds.

Any ketal groups, more especially ethylene ketals, present can be split at any desired stage of the process. This is performed with an acid reagent, for example a mineral acid or sulfonic acid, preferably in the presence of a ketone, such as acetone. In most cases the splitting can be performed by simple heating in dilute aqueous acetic acid.

The 17α:20-dihydroxy-pregnanes used as starting materials contain in the 3-position, for example, a free or esterified hydroxyl group or a free or ketalised oxo group and a double bond starting from carbon atom 5. The oxygen functions in the 11- and 18-positions are (18→11)-lactones, 18-hydroxy-11-oxo-, 11β-hydroxy-18-oxo- (or the corresponding 11:18-hemiacetals), 11β:18-dihydroxy- or 11:18-dioxo-groupings. The starting materials can be prepared from 11:18-dioxygenated 20-oxo-pregnanes by introducing, for example, the 17α-hydroxyl group in as such known manner by a microbiological method and then reducing the 20-oxo group to the hydroxyl group by means of a complex metal hydride. Of special advantage is the introduction of the 17α-hydroxyl group by way of a 16α:17α-oxido-20-ketone which is readily accessible from an appropriate Δ¹⁶-20-ketone by oxidation with hydrogen peroxide in an alkaline solution. These epoxides can be split with hydrohalic acids, for example with hydrobromic acid, to yield the 16β-halogeno-17α-hydroxy-20-oxo-compounds from which the halogen atom can be removed by reduction, for example with Raney nickel. Alternatively, the opening of the epoxide ring can be achieved with a complex metal hydride, more especially with lithium-aluminium hydride, which leads directly to the 17α-hydroxy-compound. If in this reaction oxo groups—for example in the 3:18- and/or 20-positions—are not protected (for example by preparing ketals or enamines), they are reduced at the same time. Thus it is possible, for example with the use of lithium-aluminium hydride, to convert an (18→11)-lactone of an 11β-hydroxy-16α:17α-oxido-20-oxo-pregnane-18-acid directly into an 11β:17α:18:20-tetra-hydroxy-pregnane, whereas the (18→11)-lactone of an 11β:17α-dihydroxy-20-oxo-pregnane-18-acid on reaction with sodium-boron hydride yields the (18→11)-lactone of an 11β:17α:20-trihydroxy-pregnane-18-acid.

Apart from the aforementioned 17α:20-dihydroxy compounds there are suitable as starting materials compounds which, while not really being 17α:20-glycols, are capable of reacting as such, more especially 17α:18-dihydroxy-20-oxo-pregnanes; in solution, these compounds are at least partially present as 18:20-hemiketals. When such a compound is subjected to glycol cleavage, the cleavage of the 17:20-bond occurs according to the following scheme:

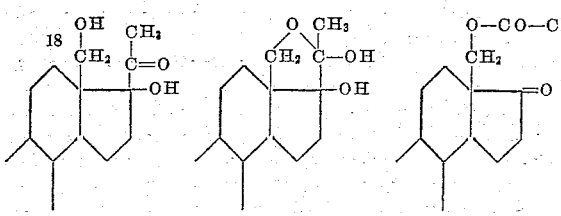

whereby an 18-acetoxy-derivative is formed.

The products of the present process are 11:18-dioxy- genated androstane compounds, for example of the formula

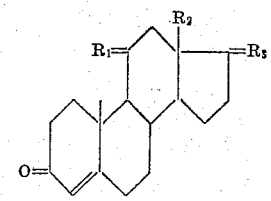

in which $R_1$ and $R_3$ stand for a hydrogen atom and a hydroxyl group or an oxo group, and $R_2$ represents a carbinol, aldehyde or carboxyl group, as well as derivatives thereof, such as ethers, esters, acetals and ketals. The products concerned include also intramolecular esters (for example (18→11)-lactones), intramolecular acetals (for example 11:18-hemiacetals) and esters thereof.

Of special importance are the following compounds: 11β:18-dihydroxy-testosterone and 17- or 18-monoesters and 17:18-diesters thereof; 11β-hydroxy-18-oxo-testosterone and its 18:11-hemiacetal and 17- and 18-monoesters and 17:18-diesters thereof; the (18→11)-lactone of 11β-hydroxy-testosterone-18-acid and 17-esters thereof; 11:18-dioxo-testosterone and 17-esters thereof; and 18-hydroxy-adrenosterone and esters thereof.

The present invention further concerns any modification of the present process in which only some of the steps are performed, if desired in a different order of succession, or the starting material used is an intermediate obtained at any stage of the process and the remaining step or steps are carried out.

The present invention further concerns mixtures of substances for use in human or veterinary medicine, containing one of the aforementioned androstane compounds in conjunction with a solid or liquid pharmaceutical excipient. The mixtures of substances are prepared by as such know methods, for example with the use of pharmaceutical organic or inorganic excipients suitable for parenteral, enteral or local administration. Suitable excipients are substances that do not react with the products of the invention such, for example, as water, vegetable oils, benzyl alcohols, polyethylene glycols, gelatine, lactose, starches, magnesium stearate, talc, white petroleum jelly, cholesterol or other known pharmaceutical excipients. There are especially made preparation for parenteral administration, preferably solutions, above all oily or aqueous solutions, furthermore suspensions, emulsions or implants; for enteral administration there are similarly also made tablets or dragees, and for local administration also ointments or creams. If desired, the preparations can be sterilised or auxiliaries may be added thereto, such as preserving, stabilising, wetting or emulsifying agents, salts for regulating the osmotic pressure, or buffers. They may also contain other therapeutically useful substances. The preparations are obtained in the customary way. The content of active substance in these preparations, such as of an ampoule, is preferably 0.1–200 mg., or 0.03–60%.

The following examples illustrate the invention.

*Example 1*

1.6 grams of lithium-aluminum hydride and 40 cc. of tetrahydrofuran are treated with stirring in a current of nitrogen with a solution of 1 gram of the (18→11)-lactone of d:l-Δ⁵-3-ethylenedioxy-11β-hydroxy-16:17α-oxido-20-oxo-pregnene-18-acid (described in Example 7) in 60 cc. of tetrahydrofuran and rinsed with 20 cc. of tetrahydrofuran. The mixture is stirred for 2 hours at room temperature, heated to 50°, and stirred on for another 16 hours at that temperature. While cooling with a mixture of ice and sodium chloride, a mixture of 20 cc. of ethyl acetate and 40 cc. of benzene and 30 minutes later 50 cc. of a semi-saturated solution of Rochelle salt are added dropwise. Then another addition of dilute Rochelle salt solution is made, the whole is shaken with 350 cc. of chloroform, the chloroformic solution is washed with 60 cc. of Rochelle salt solution of 30% strength and with 70 cc. of sodium chloride solution of 20% strength, and the aqueous solutions are twice more extracted with 200 cc. each of a mixture of 4 parts of chloroform and 1 part of alcohol. The organic solutions are combined, dried over sodium sulfate and evaporated in vacuo under nitrogen at a bath temperature of 25° C.; the residue is dissolved in 40 cc. of glacial acetic acid and while being stirred and cooled with ice water, treated with a solution of 4 grams of lead tetraacetate in 60 cc. of glacial acetic acid. The mixture is kept for 18 hours at room temperature in the dark, diluted with 500 cc. of a 0.5% solution of sodium thiosulfate solution, and extracted three times by being shaken with chloroform; the combined chloroformic extracts are washed twice with dilute sodium bicarbonate solution and once with water. The washings are then extracted twice with chloroform and the combined and dried chloroformic extracts are evaporated in vacuo under nitrogen at a bath temperature of 20° C. The residue is treated with a mixture, stirred for 1½ hours, of 2 grams of powdered sodium acetate and 3 mols of water of crystallization and 20 cc. of acetanhydride and rinsed with 3 cc. of acetanhydride. The mixture is stirred for 16 hours at room temperature, stirred into a mixture of water and ice, washed with 2 cc. of methanol and a little water, and at 0° C. 35 grams of sodium bicarbonate are gradually added. The whole is then shaken three times with chloroform and twice washed with semi-saturated sodium chloride solution. The organic solutions are dried and evaporated in vacuo at a bath temperature of 30° C., and the residue is chromatographed on 45 grams of silica gel. From the benzolic fractions containing 30% of ethyl acetate the d:l-$\Delta^5$-3-ethylenedioxy-11$\beta$-hydroxy-17-oxo-18-acetoxy-androstene is eluted; after having been recrystallised from methylene chloride+ether it melts at 177–178° C. Its infra-red spectrum (in methylene chloride) displays inter alia the following characteristic bands: 2.77$\mu$ (hydroxyl); 5.74$\mu$ (acetate+5-ring ketone); 8.11$\mu$ (acetate); 9.17$\mu$ (ketal).

A solution of 83 mg. of the resulting androstane derivative in 10 cc. of tetrahydrofuran is treated with 200 mg. of lithium-aluminium hydride under nitrogen while being stirred and cooled with ice, and the mixture is stirred for 2 hours while allowing the ice to melt slowly. While being cooled with ice and stirred, the whole is then slowly treated with a mixture of 3 cc. of ethyl acetate and 6 cc. of benzene and 10 minutes later with 10 cc. of N-Rochelle salt solution. Another addition of dilute Rochelle salt solution is made, the whole is shaken twice with benzene and once with ether, the organic solutions are washed with dilute Rochelle salt solution and twice with water. The organic solutions are dried and evaporated in vacuo, and the crystalline residue is washed with acetone and recrystallised from mixtures of alcohol+ether and methylene chloride+ether. The resulting d:l-$\Delta^5$-3-ethylenedioxy-11$\beta$:17$\beta$:18-trihydroxyandrostene melts at 241–244° C.

To perform the ketal cleavage, 40 mg. of the triol obtained as described above are dissolved in 5 cc. of glacial acetic acid, 5 cc. of water are added, and the whole is immersed for 10 minutes in a bath heated at 100° C. while passing nitrogen over. The reaction solution is cooled, evaporated in vacuo, treated with acetone and once more evaporated in vacuo, and this operation is repeated with benzene. The residue dried in this manner is dissolved in a mixture of acetone and ether, whereupon d:l-11$\beta$:18-dihydroxy-testosterone crystallises out. After being recrystallised from a mixture of alcohol+methylene chloride+ether it melts at 193–193.5° C. Its infra-red spectrum (in methylene chloride) displays, in addition to a broad hydroxyl band at 2.76–2.85$\mu$, the bands characteristic of $\Delta^4$-3-ketone at 5.99$\mu$ and 6.18$\mu$. Ultra-violet spectrum $\lambda$ max. 2.42 m$\mu$.; $\epsilon$=16400.

The same reaction sequence can also be carried out with other ketals of d,l-$\Delta^4$-3-oxo-16,17$\alpha$-oxido-20-oxo-pregnene-18-acid, e.g. with the propylene ketal or any other lower alkylene-ketal.

*Example 2*

5 grams of the (18→11)-lactone of d:l-$\Delta^5$-3-ethylenedioxy-11$\beta$-hydroxy - 16:17$\alpha$ - oxido-20-oxo-pregnene-18-acid are reduced with lead tetraacetate as described in Example 1 and then treated with sodium acetate and acetanhydride. On completion of the acetylation 100 cc. of xylene are added, the mixture is stirred for 15 minutes, filtered through Celite and washed on the filter with 100 cc. of xylene and 50 cc. of chloroform. The filtrate is evaporated to dryness in a high vacuum at a bath temperature of 30–35° C. The residue is dissolved in xylene, the solution is again evaporated in a high vacuum, and this operation is repeated twice more, followed by chromatography on 200 grams of silica gel. The first benzene+ethyl acetate fraction (7:3) contains the d:l-$\Delta^5$-3-ethylenedioxy-11$\beta$-hydroxy-17:18-dioxo - androstene cyclohemiacetal acetate which, after recrystallisation from methylene chloride+ether, melts at 233–236° C. Infra-red spectrum in methylene chloride: bands at 5.74$\mu$ (acetate+5-ring ketone), 8.15$\mu$ (acetate); 9.18$\mu$ (ketal).

The subsequent benzene+ethyl acetate fractions (7:3) contain the d:l-$\Delta^5$-3-ethylenedioxy-11$\beta$-hydroxy-17-oxo-18-acetoxy-androstene described in Example 1.

44 mg. of the cyclohemiacetal acetate described above are dissolved in 3 cc. of absolute tetrahydrofuran, and a solution of 1.5 mg. of sodium-boron hydride in 0.03 cc. of water is stirred in. The whole is stirred for 25 hours at room temperature, a mixture of 0.005 cc. of glacial acetic acid and 1 cc. of water is added, then chloroform is added and the mixture is washed three times with dilute sodium chloride solution. The aqueous solutions are further extracted twice with chloroform, and the organic solutions are dried and evaporated in vacuo. The residue is dissolved in 6.5 cc. of methanol and a solution of 60 mg. of potassium carbonate in 2 cc. of water is added. Two days later the crystals formed are filtered off and washed with water and ether. After having been boiled with a little methylene chloride and redissolved from chloroform+methylene chloride, the resulting d:l-$\Delta^5$-3-ethylenedioxy - 11$\beta$ - hydroxy-18-oxo-18-nor-18-$\xi$-androstene melts at 252–256° C. Bands in the infra-red spectrum in potassium bromide: at 2.87$\mu$ (hydroxyl); 5.75$\mu$ (5-ring ketone) and 9.09$\mu$ (ketal).

The aqueous alkaline mother liquor is treated with sodium chloride solution and extracted three times with chloroform. The organic solutions are washed with dilute sodium chloride solution, dried and evaporated in vacuo, the residue is combined with the methylene chloride+chloroformic mother liquors of the 18-nor-androstene derivative obtained above, and the whole is heated under nitrogen with 1 cc. of 90% acetic acid for 10 minutes at 100° C., evaporated in vacuo, the residue dissolved in benzene, again evaporated in vacuo and chromatographed on 25 sheets of paper in the system formamide/benzene+chloroform (1:1). The zones having the $R_F$-values 0.35 and 0.8 are then cut out and separately extracted as follows: The material is distintegrated, pasted with 100 cc. of 20% tetrahydrofuran and suction-filtered. This operation is repeated with the filter cake twice with 80 cc. each of 20% tetrahydrofuran, three times with 80 cc. each of 50% tetrahydrofuran, once with 80 cc. of 75% tetrahydrofurant and once with 80 cc. of undiluted tetrahydrofuran. The filtrates are combined and extensively freed from tetrahydrofuran in a water-jet vacuum at a bath temperature of 50° C. under nitrogen and then extracted three times with 100 cc. of methylene chloride. The organic solutions are washed twice with 50 cc. of water, dried and evaporated in vacuo, and the residue is recrystallised from a mixture of methylene chloride and ether with the use of 10 mg.

of carboraffin. The zone of $R_F$-value 0.35 yields in this manner 10 mg. of d:l-$\Delta^4$-3:18-dioxo-11$\beta$:17$\beta$-dihydroxyandrostene cyclohemiacetal melting at 225.5–226.5° C. The infra-red spectrum in chloroform displays inter alia bands at 2.77$\mu$ and 2.85$\mu$ (hydroxyl); 5.98$\mu$ and 6.18$\mu$ ($\Delta^4$-3-ketone). Acetylation of this compound with pyridine and acetanhydride yields the cyclohemiacetal acetate of d:l-$\Delta^4$-3:18-dioxo-11$\beta$-hydroxy-17$\beta$-acetoxy-androstene which, after recrystallisation from a mixture of methylene chloride and ether, melts at 237.5–239.5° C.

The zone of $R_F$-value 0.8 yields 5 mg. of d:l-$\Delta^4$-3:17-dioxo-11$\beta$-hydroxy-18-nor-18$\xi$-androstene melting at 253–262° C. Its infra-red spectrum in methylene chloride displays inter alia the following characteristic bands: 2.77$\mu$ (hydroxyl); 5.75$\mu$ (17-ketone); 5.97$\mu$ and 6.16$\mu$ ($\Delta^4$-3-ketone).

*Example 3*

A solution of 31 mg. of sodium-boron hydride in 0.5 cc. of water is stirred into a solution of 800 mg. of d:l-$\Delta^5$-3-ethylenedioxy - 11$\beta$ - hydroxy-17-oxo-18-acetoxy-androstene in 40 cc. of absolute tetrahydrofuran and then rinsed with 10 cc. of tetrahydrofuran. The mixture is stirred for 6 hours at room temperature, mixed with 5 mg. of sodium-boron hydride and stirred on for another 16 hours. The surplus reducing agent is then decomposed with 1.1 cc. of acetic acid of 10% strength, then 150 cc. of water and 100 cc. of saturated sodium chloride solution are added, and the whole is extracted three times with 200 cc. of chloroform. The organic solutions are washed with dilute sodium chloride solution and water, dried and evaporated in vacuo, and the residue is dissolved in 10 cc. of benzene and chromatographed on 40 grams of silica gel containing 15% of water. The fractions eluted with benzene+ethyl acetate (9:1) and (17:3) yield after redissolution from methylene chloride+ether 440 mg. of d:l-$\Delta^5$-3-ethylenedioxy-11$\beta$:18-dihydroxy-17$\beta$-acetoxy-androstene. After having been dissolved and again precipitated from the same mixture of solvents it melts at 191.5–193.5° C. Infra-red spectrum in methylene chloride: bands at 2.79$\mu$ and 2.85$\mu$ (hydroxyl); 5.74$\mu$ and 8.10$\mu$ (acetate); 9.18$\mu$ (ketal).

When a solution of 15 mg. of the diol-monoacetate obtained as described above and 2.5 mg. of sodium acetate in 1 cc. of acetanhydride is kept for 24 hours, there is obtained the d:l-$\Delta^5$-3-ethylenedioxy-11$\beta$-hydroxy-17$\beta$:18-diacetoxy-androstene which melts at 207–208.5° C. after redissolution from methylene chloride+ether. Infra-red spectrum in methylene chloride: banks at 2.76$\mu$ (hydroxyl); 5.75$\mu$ and 8.10$\mu$ and 8.10$\mu$ (acetate); 9.15$\mu$ (ketal).

The fractions eluted in the above chromatogram with 7:3-mixtures of benzene and ethyl acetate yield, after redissolution from a mixture of methylene chloride and ether, 145 mg. of the d:l-$\Delta^5$-3-ethylenedioxy-11$\beta$:17$\beta$-dihydroxy-18-acetoxy-androstene. The analytically pure product melts at 209.5–212.5° C. with decomposition. Infra-red spectrum in methylene chloride: bands at 2.76$\mu$ (hydroxyl); 5.74$\mu$ and 8.11$\mu$ (acetate); 9.09$\mu$ (ketal). When a mixture of 15 mg. of the above 18-monoacetate is kept for 16 hours with 1 cc. of pyridine and 1 cc. of acetanhydride, it yields a diacetate which, according to its melting point, mixed melting point and infra-red spectrum, is identical with the d:l-$\Delta^5$-3-ethylenedioxy-11$\beta$-hydroxy-17$\beta$:18-diacetoxy-androstene obtained above.

A solution of 120 mg. of aluminium tertiary butylate in 10 cc. of toluene is treated with 100 mg. of d:l-$\Delta^5$-3-ethylenedioxy - 11$\beta$:18 - dihydroxy - 17$\beta$ - acetoxy - androstene and 2.5 cc. of cyclohexanone. The whole is boiled for 2 hours under nitrogen, cooled, mixed with dilute Rochelle salt solution and extracted three times with benzene. The organic solutions are washed with dilute Rochelle salt solution and water, dried and evaporated in vacuo. The residue is dried in a high vacuum at 100° C.; after having been repeatedly recrystallized from methylene chloride+ether, it yields the (18→11)-lactone of d:l-$\Delta^5$-3-ethylenedioxy-11$\beta$-hydroxy-17$\beta$-acetoxy-androstene-18-acid melting at 259–260° C. Infra-red spectrum in methylene chloride: bands at 5.64$\mu$ ($\gamma$-lactone); 5.76$\mu$ and 8.11$\mu$ (acetate); 9.07$\mu$ (ketal).

A mixture of 32 mg. of the resulting lactone with 2 cc. of acetic acid of 90% strength is immersed for 5 minutes in a bath heated at 120° C., then evaporated in vacuo, mixed with benzene and again evaporated in vacuo, this operation being repeated twice more. The residue is chromatographed on 8 sheets of paper in the system formamide/cyclohexane+benzene (1:1). The zone of $R_F$=0.4 is extracted as described in Example 2, and the extract is redissolved from methylene chloride+ether, with the use of 10 mg. of Carboraffin, to yield the (18→11)-lactone of d:l-$\Delta^4$-3-oxo-11$\beta$-hydroxy-17$\beta$-acetoxy-androstene-18-acid melting at 210–210.5° C. Infra-red spectrum in methylene chloride: bands at 5.62$\mu$ ($\gamma$-lactone); 5.74$\mu$ and 8.13$\mu$ (acetate); 5.97$\mu$ and 6.17$\mu$ ($\Delta^4$-3-ketone).

*Example 4*

A mixture of 0.184 cc. of pyridine and 8 cc. of benzene is treated with a mixture of 0.16 cc. of methanol, 0.16 cc. of acetyl chloride and 8 cc. of benzene, and then with 20 cc. of dihydropyran, and the whole is stirred for 20 minutes. 200 mg. of d:l-$\Delta^5$-3-ethylenedioxy-11$\beta$:17$\beta$-dihydroxy-18-acetoxy-androstene, described in Example 3, are then added. The whole is stirred for 4 days in a closed vessel at room temperature, diluted with benzene and washed with dilute sodium bicarbonate solution and water. The aqueous extracts are extracted twice more with benzene, and the organic solutions are combined, dried and evaporated in vacuo. The residue is dried in a high vacuum at 60° C. and redissolved in ether, to yield 145 mg. of d:l-$\Delta^5$-3-ethylenedioxy-11$\beta$-hydroxy-17$\beta$-tetrahydropyranyloxy-18-acetoxy-androstene as a mixture of its stereoisomers, melting at 150–160° C. Infra-red spectrum in methylene chloride: bands at 276$\mu$ (hydroxyl); 5.75$\mu$ and 8.10$\mu$ (acetate); 9,10$\mu$ (ketal).

100 mg. of lithium-aluminium hydride are stirred into a solution of the above tetrahydropyranyl ether in 10 cc. of absolute tetrahydrofuran under nitrogen while cooling with ice, and the mixture is then stirred for 1 hour at room temperature. While cooling with ice, a mixture of 2 cc. of ethyl acetate and 3 cc. of benzene, and 10 minutes later a dilute Rochelle salt solution are added dropwise. The mixture is shaken three times with benzene, and the organic solution are washed with dilute Rochelle salt solution, dried and evaporated in vacuo. Recrystallisation of the residue from methylene chloride+ether yields 111 mg. of the d:l-$\Delta^5$-3-ethylenedioxy-11$\beta$:18-dihydroxy-17$\beta$-tetrahydropyranyloxy-androstene having the following characteristic bands in the infra-red spectrum in methylene chloride: 2.82$\mu$ (hydroxyl) and 9.17$\mu$ (ketal).

While cooling with ice, 94 mg. of the resulting tetrahydropyranyl ether are stirred into a mixture of 5 cc. of pyridine and 100 mg. of chromium trioxide. The whole is stirred for 24 hours at room temperature, treated with semi-saturated sodium chloride solution and benzene, thoroughly shaken, separated, and the aqueous phase is extracted twice more with benzene. The organic solutions are washed with dilute sodium chloride solution, dried and evaporated in vacuo, and the residue is dissolved in 1 cc. of benzene and filtered through 1 gram of alumina (activity II) and the filter cake washed with 30 cc. of benzene. The filtrate is evaporated and the colourless crystalline residue heated with 6 cc. of acetic acid of 83% strength for 10 minutes in a current of nitrogen in a bath heated at 100° C. The whole is evaporated in vacuo, mixed with 2 cc. of pyridine and 2 cc. of acetanhydride and kept overnight at room temperature. Ice is then added, the mixture stirred for some time and then extracted three times with benzene. The benzolic solutions are washed successively with dilute hydrochloric acid, dilute sodium bicarbonate solution and water, dried and evaporated in vacuo. The residue is chromatographed for 4 hours in the system formamide/cyclohexane+benzene (1:1) on 30 sheets of paper, whereby two zones of $R_F=0.47$ and 0.55 respectively are obtained. These zones are cut out, disintegrated and pasted with 100 cc. of tetrahydrofuran of 20% strength. The solution is filtered and the filter cake pasted twice with 80 cc. of 20% tetrahydrofuran, three times with 80 cc. of 50% tetrahydrofuran, once with 80 cc. of 75% tetrahydrofuran and once with 80 cc. of undiluted tetrahydrofuran. The combined filtrates are extensively freed from tetrahydrofuran at a bath temperature of 50° C. under nitrogen in a water-jet vacuum and then extracted three times with methylene chloride. The methylene chloride extracts are washed with water, dried and evaporated in vacuo, and the residue recrystallised from methylene chloride+ether with the use of 10 mg. of Carboraffin. The zone of $R_F=0.47$ yields 12 mg. of the d:l-$\Delta^4$-3:11:18-tri-oxo-17β-acetoxy-androstene melting at 183–189.5° C. Its infra-red spectrum in methylene chloride displays inter alia the following characteristic bands: 5.79µ with inflection at 5.74µ (acetate+aldehyde+11-ketone); 5.97µ and 6.18µ ($\Delta^4$-3-ketone); 8.14µ (acetate).

The zone of $R_F=0.55$ yields the (18→11)-lactone of d:l - $\Delta^4$ - 3 - oxo - 11β - hydroxy - 17β - acetoxy - androstene-18-acid, which shows no depression of its melting point in admixture with the product described in Example 3 and has an identical infra-red spectrum.

*Example 5*

173 mg. of d:l-$\Delta^5$-3-ethylenedioxy-11β:18-dihydroxy-17β-tetrahydropyranyloxy-androstene described in Example 4 are rinsed with 6 cc. of cyclohexanone and 10 cc. toluene into a solution of 310 mg. of aluminium-tertiary butylate in 20 cc. of toluene. The whole is refluxed for 18 hours under nitrogen, cooled, treated with dilute Rochelle salt solution and extracted three times with benzene. Any undissolved matter is filtered off through a $G_3$-glass sinter suction filter. The organic solutions are washed with dilute Rochelle salt solution and water, dried and evaporated in vacuo; the residue is dried in a high vacuum at 100° C. and recrystallised from a mixture of methylene chloride and ether with the use of 10 mg. of carboraffin, to yield 90 mg. of crystals melting at 117–182° C. which, as revealed by their infra-red spectrum (γ-lactone band at 5.62µ), contain the (18→11)-lactone of d:l-$\Delta^5$-3-ethylenedioxy - 11β - hydroxy - 17β - tetrahydropyranyloxy-androstene-18-acid. Further oxidation of this crystallisate with chromium trioxide in pyridine, ketal cleavage and acetylation as described in Example 4 leads to the (18→11)-lactone of d:l-$\Delta^4$-3-oxo-11β-hydroxy-17β-acetoxy-androstene-18-acid.

*Example 6*

100 mg. of chromium trioxide and 5 cc. of pyridine are treated with stirring and cooling with 80 mg. of d:l-$\Delta^5$-3-ethylenedioxy - 11β - hydroxy - 17 - oxo - 18 - acetoxy-androstene described in Example 1. The mixture is stirred overnight, then treated with benzene and dilute sodium chloride solution, thoroughly shaken, and the aqueous phase is extracted twice with benzene. The organic solutions are repeatedly washed with dilute sodium chloride solution, dried and evaporated in a water-jet vacuum, and the residue is recrystallised from methylene chloride+ether, to yield 71 mg. of d:l-$\Delta^5$-3-ethylenedioxy-11:17-dioxo-18-acetoxy-androstene melting at 216.5–218.5° C. A sample repeatedly recrystallised from the same mixture of solvents melts at 220–221° C. Infra-red spectrum in methylene chloride: No hydroxyl bands; 5:72µ (strong, acetate+17-ketone); 5.84µ (11-ketone); 8.13µ (acetate) and 9.10µ (ketal).

A solution of 40 mg. of d:l-$\Delta^5$-3-ethylenedioxy-11:17-dioxo-18-acetoxy-androstene in 4.5 cc. of glacial acetic acid and 0.5 cc. of water is immersed for 10 minutes in a bath heated at 96° C. under nitrogen, evaporated in a water-jet vacuum; treated with benzene and again evaporated in a water-jet vacuum. To purify the residue it is chromatographed on 12 sheets of paper in the system formamide/cyclohexane+benzene (1:2). The zone of $R_F=0.45$ is extracted as described in Example 2 and recrystallised from a mixture of acetone+ether with the use of 20 mg. of carboraffin, to yield 17 mg. of d:l-$\Delta^4$-3:11:17-trioxo-18-acetoxy-androstene melting at 168.5–169.5° C. Infra-red spectrum in methylene chloride: 5.72µ (acetate+17-ketone); 5.82µ (11-ketone); 5.97µ and 6.16µ ($\Delta^4$-3-ketone).

*Example 7*

5.00 grams of the (18→11)-lactone of d:l-$\Delta^{5:16}$-3-ethylenedioxy-11β-hydroxy - 20 - oxo - pregnadiene-18-acid are dissolved in a mixture of 200 cc. of benzene and 600 cc. of methanol. The solution is cooled to 0° C. and treated with 10 cc. of N-sodium hydroxide solution and 20 cc. of aqueous hydrogen peroxide of 30% strength, and the mixture is kept for 25 hours at 0° C., then poured into 2 litres of water and extracted three times with 1.5 liters of chloroform on each occasion. The chloroformic extracts are washed with water, combined, dried, and evaporated under diminished pressure. Recrystallisation of the crystalline residue (5.36 grams) from methylene chloride+methanol yields 5.03 grams of the (18→11)-lactone of d:l-$\Delta^5$-3-ethylenedioxy-11β-hydroxy-16:17α-oxido - 20-oxo-pregnene-18-acid melting at 272.5–275° C. Infrared spectrum in methylene chloride: bands at 5:64µ (γ-lactone); 5.84µ (20-ketone); 9.10µ (ketal).

A solution of 90 mg. of para-toluenesulfonic acid in 150 cc. of ethylene glycol is mixed with 1.5 grams of the (18→11)-lactone of d:l-$\Delta^5$-3-ethylenedioxy-11β-hydroxy-16:17α-oxido-20-oxo-pregnene-18-acid, and in the course of 1 hour 50 cc. of ethylene glycol are distilled off in a water-jet vacuum under nitrogen. The contents of the flask are cooled in vacuo, poured into a mixture of 125 lc. of water, 25 cc. of saturated sodium bicarbonate solution and 150 cc. of saturated sodium chloride solution and extracted three times with 150 cc. of benzene. The organic solutions are washed twice with 30 cc. of water, dried and evaporated in vacuo, the residue is dissolved in 20 cc. of benzene and filtered through 5 grams of alumina (activity II) and rinsed on the filter with 230 cc. of benzene. The filtrate is evaporated in a water-jet vacuum and the residue recrystallised from methylene chloride+ether to yield 1.16 grams of the (18→11)-lactone of d:l-$\Delta^5$-3:20-(bis - ethylenedioxy) - 11β - hydroxy-16:17α-oxido-pregnene-18-acid melting at 219.5–221.5° C. Further amounts of the diketal can be obtained by chromatography of the mother liquor on alumina. The analytically pure compound melts at 222.5–225.5° C. Its infra-red spectrum in methylene chloride contains, inter alia, characteristic bands at 5.64µ (γ-lactone) and 9.09µ (ketal).

A mixture of 1.2 grams of lithium-aluminium hydride and 60 cc. of tetrahydrofuran is treated while being cooled with ice under nitrogen with 1.9 grams of the (18→11)-lactone of d:l-$\Delta^5$-3:20-(bis-ethylenedioxy)-11β-hydroxy-16:17α-oxido-pregnene-18-acid with rinsing with 20 cc. of tetrahydrofuran. The mixture is stirred for 16 hours at room temperature and while being cooled with a mixture of ice and sodium chloride treated with a mixture of 20 cc. of ethyl acetate and 60 cc. of benzene, and 40 minutes later with dilute Rochelle salt solution, then extracted three times with chloroform (to remove any undissolved matter the mixture must be filtered through Celite). The organic solutions are washed with dilute Rochelle salt solution and dilute sodium chloride solution, dried and evaporated in vacuo, and the residue is recrystallised from methylene chloride+ether, to yield 1.75 grams of d:l-$\Delta^5$-3:20-(bis-ethylenedioxy)-11β:17α:18 - trihydroxy - pregnene. Its infra-red spectrum contains no bands in the carbonyl area.

1.5 grams of aluminium-tertiary butylate in 150 cc. of toluene are treated with 1.08 grams of d:l-Δ⁵-3:20-(bis-ethylenedioxy)-11β:17α:18-trihydroxypregnene and 36 cc. of cyclohexanone, and the mixture is refluxed for 16 hours under nitrogen, cooled, treated with 1-molar Rochelle salt solution and shaken three times with methylene chloride. The organic solutions are washed with dilute Rochelle salt solution, dried, evaporated in a water-jet vacuum and freed in a high vacuum at 120° C. from high-boiling constituents. Recrystallisation of the residue from methylene chloride+ether yields 720 mg. of a mixture melting at 180–218° C. which consists mainly of the initial triol and d:l-Δ⁵-3:20-(bis-ethylenedioxy)-11-oxo-17α:18-dihydroxy-pregnene. This mixture is resolved in the system formamide/cyclohexane+benzene (1:2) on 320 sheets of paper. The composition of the individual zones is revealed by sprinkling the cut-out strips with glycolic acid, heating and photocopying in ultraviolet light. Elution of the zone of $R_F$=0.45 yields d:l-Δ⁵-3:20-(bis-ethylenedioxy)-11-oxo-17α:18-dihydroxy-pregnene. After having been recrystallised from methylene chloride+acetone it melts at 236–240° C., and its infra-red spectrum in methylene chloride contains inter alia the following characteristic bands: 2.82μ (hydroxyl); 5.87μ (11-ketone) and 9.10μ (ketal). The zone of $R_F$=0.62 yields unreacted d:l-Δ⁵-3:20-(bis-ethylenedioxy)-11β:17α:18-trihydroxy-pregnene.

50 mg. of d:l-Δ⁵-3:20-(bis-ethylenedioxy)-11-oxo-17α:18-dihydroxy-pregnene are kept overnight at room temperature with 3 cc. of pyridine and 2.5 cc. of acetanhydride, the whole is then evaporated in vacuo, treated with benzene, again evaporated in vacuo and the residue is recrystallised from methylene chloride+ether. The resulting d:l-Δ⁵-3:20-(bis-ethylenedioxy)-11-oxo-17α-hydroxy-18-acetoxy-pregnene melts at 260–263.5° C. and displays inter alia the following bands in the infra-red spectrum in Nujol: 2.84μ (hydroxyl); 5.75μ and 8.07μ (acetate); 5.87μ (11-ketone) and 9.05μ (ketal).

Hydrolysis with methanolic potassium carbonate solution yields again d:l-Δ⁵-3:20-(bis-ethylenedioxy)-11-oxo-17α:18-dihydroxy-pregnene.

550 mg. of d:l-Δ⁵-3:30-(bis-ethylenedioxy)-11-oxo-17α:18-dihydroxy-pregnene are dissolved with heating in 31.6 cc. of glacial acetic acid and 4.7 cc. of water, and this solution is immersed for 10 minutes in a bath heated at 130° C. under nitrogen, cooled in ice water, evaporated in vacuo, treated with benzene, again evaporated in vacuo, and this operation is repeated twice more. The resulting reaction product is resolved in the usual manner on 240 sheets of paper in the system formamide/benzene+chloroform (1:1) and zones having the $R_F$ values of 0.15, 0.38 and 0.50 are obtained. The zone of $R_F$=0.15 yields a small amount of a compound melting at 221.5–222.5° C. Ultra-violet spectrum in rectified alcohol: $\lambda_{max}$240 mμ; ε=17000. The infra-red spectrum in methylene chloride contains inter alia bands at 2.79μ; 5.88μ (weak); 5.98μ and 6.18μ. The zone of $R_F$=0.38, on being extracted and recrystallised from methylene chloride+ether, yields 224 mg. of d:l-Δ⁴-3:11:20-trioxo-17α:18-dihydroxy-pregnene which, after having been further recrystallised, melts at 210.5–215° C. Ultra-violet spectrum in rectified alcohol: Maximum at 238 mμ (ε=15000). Infra-red spectrum in methylene chloride: 2.82 mμ (hydroxyl); 5.85μ (ketone); 5.97μ and 6.17μ (Δ⁴-3-ketone).

After having been recrystallised from methylene chloride+ether, the zone of $R_F$=0.50 yields 184 mg. of d:l-Δ⁴-3:11-dioxo-17α:18-dihydroxy-20-ethylenedioxy-pregnene. A sample repeatedly recrystallised from the same solvents mixture with the addition of carboraffin melts at 222–222.5° C. The infra-red spectrum in methylene chloride contains inter alia the following characteristic bands: 2.83μ (broad, hydroxyl); 5.86μ (11-ketone); 5.98μ and 6.17μ (Δ⁴-3-ketone).

21 mg. of d:l-Δ⁴-3:11-dioxo-17α:18-dihydroxy-20-ethylenedioxy-pregnene are pasted with 0.2 cc. of pyridine and 0.2 cc. of acetanhydride, with temporary dissolution occurring, and soon afterwards crystallisation sets in again. 14 hours later, the mixture is treated with ether, cooled to −10° C., filtered and the filter residue is washed with ether. The resulting d:l-Δ⁴-3:11-dioxo-17α-hydroxy-18-acetoxy-20-ethylenedioxy pregnene melts at 212.5–214.5° C. The product does not display a higher melting point after recrystallisation from methylene chloride+ether. Infra-red spectrum in methylene chloride: 2.82μ (hydroxyl); 5.75μ and 8.17μ (acetate); 5.86μ (11-ketone); 5.98μ and 6.17μ (Δ⁴-3-ketone).

A solution of 10 mg. of d:l-Δ⁴-3:11:20-trioxo-17α:18-dihydroxy-pregnene in 0.8 cc. of chloroform is stirred for 6 hours with 120 mg. of manganese dioxide, filtered through Celite, washed on the filter with chloroform, and the filtrate evaporated in vacuo. Recrystallisation of the residue from methylene chloride+ether yields 5 mg. of the d:l-Δ⁴-3:11:17-trioxo-18-ocetoxy-androstene described in Example 6.

Example 8

A solution of 360 mg. of the (18→11)-lactone of d:l-Δ⁵-3:20-(bis-ethylenedioxy)-11β-hydroxy-16:17α-oxido-pregnene-18-acid in 10 cc. of absolute tetrahydrofuran is treated under nitrogen with stirring and ice cooling with 400 mg. of lithium-aluminium hydride. The ice is then removed, the mixture stirred for 2 hours at room temperature and, while again being cooled with ice-treated dropwise with 5 cc. of acetanhydride and 5 cc. of benzene, heated for 1 hour at 60° C., poured into Rochelle salt solution and extracted three times with chloroform (any undissolved matter must be filtered off through Celite). The organic solutions are washed with dilute Rochelle salt solution and dilute sodium chloride solution, dried, and evaporated in vacuo, and the residue is chromatographed on 12 grams of alumina (activity II). The fractions eluted with benzene+petroleum ether (1:2) and with benzene contain the d:l-Δ⁵-3:20-(bis-ethylenedioxy)-11β:17α-dihydroxy-18-ocetoxy-pregnene which, after recrystallisation from methylene chloride+ether, melts at 183–192° C. The infra-red spectrum in methylene chloride contains characteristic bands at 2.79μ (hydroxyl); at 5.75μ and 8.12μ (acetate) and at 9.10μ (ketal).

Elution with ether+methanol (9:1) yields the d:l-Δ⁵-3:20-(bis-ethylenedioxy)-11β:17α-18-trihydroxy-pregnene described in Example 7 which, after recrystallisation from methylene chloride+ether, melts at 184.5–190° C.

The 18-monoacetate of d:l-Δ⁵-3:20-(bis-ethylenedioxy)-11β:17α-18-trihydroxy-pregnene can be prepared from it as follows: 500 mg. of very finely powdered sodium acetate containing water of crystallisation and 5 cc. of acetanhydride are stirred together for 1½ hours, and 50 mg. of the triol and 2 cc. of acetanhydride are then added. The mixture is stirred over-night and then poured into ice water, stirred for 30 minutes and then extracted twice with benzene. The benzolic solutions are washed with dilute sodium bicarbonate solution and water, dried, and evaporated in vacuo, the residue is freed from the last traces of acetanhydride by being dissolved in a small amount of toluene, and the toluene is again evaporated in vacuo. Recrystallisation of the residue from methylene chloride+ether yields 28 mg. of d:l-Δ⁵-3:20-(bis-ethylenedioxy)-11β:17α-dihydroxy-18-acetoxy-pregnene which shows no depression of the melting point in admixture with the 18-monoacetate obtained as described above.

27 mg. of d:l-Δ⁵-3:20-(bis-ethylenedioxy)-11β:17α-dihydroxy-18-acetoxy-pregnene, together with 5.14 cc. of glacial acetic acid and 0.8 cc. of water, are immersed for 15 minutes in a bath heated at 130° C. in a current of nitrogen, evaporated in vacuo, treated with benzene, again evaporated in vacuo, and this operation is repeated once again, and the residue is recrystallised from methylene chloride+acetone+ether. The resulting d:l-$\Delta^4$-3:20-dioxo-11$\beta$:17$\alpha$-dihydroxy-18-acetoxy-pregnene shows no depression of the melting point in admixture with the product obtained as described in Example 9, and their infra-red spectra are identical.

20 mg. of d:l-$\Delta^5$-3:20-(bis-ethylenedioxy)-11$\beta$:17$\alpha$-dihydroxy-18-acetoxy-pregnene are stirred into a mixture of 40 mg. of chromium trioxide and 2 cc. of pyridine. The mixture is stirred for 4 hours at room temperature, treated with benzene and sodium chloride solution of 5% strength, thoroughly shaken, and the aqueous phase is separated and extracted twice with benzene. The organic solutions are washed three times with 5% sodium chloride solution, dried, and evaporated in vacuo. The residue is recrystallised twice from methylene chloride+ether; according to its melting point, mixed melting point and infra-red spectrum it is identical with the d:l-$\Delta^5$-3:20-(bis-ethylenedioxy)-11-oxo-17$\alpha$-hydroxy-18-acetoxy-pregnene described in Example 7.

Example 9

1 cc. of a 0.59-molecular solution of lithium-aluminium hydride in tetrahydrofuran is stirred under nitrogen into a solution of 315 mg. of the (18→11)-lactone of d:l-$\Delta^5$-3:20-(bis-ethylenedioxy)-11$\beta$-hydroxy-16:17$\alpha$-oxido-pregnene-18-acid in 5 cc. of absolute tetrahydrofuran. The whole is stirred for 3½ hours at room temperature, 1.5 cc. of acetanhydride are added dropwise, and the mixture is stirred on for 16 hours at room temperature. Dilute Rochelle salt solution is added, the whole extracted by shaking three times with methylene chloride, and the organic solutions are washed with water, dried, and evaporated in vacuo. A solution of the residue in 27 cc. of glacial acetic acid and 4 cc. of water is immersed for 15 minutes in a bath heated at 130° C. under nitrogen, evaporated in a high vacuum, and the residue is dissolved in methylene chloride. The methylene chloride solution is then extracted with dilute sodium bicarbonate solution and water. The aqueous solutions are extracted twice with fresh methylene chloride, and the organic solutions are combined, dried, and evaporated in vacuo. Recrystallisation of the residue from acetone+ether yields 116.3 mg. of crystals melting at 162–218° C. which are chromatographed on 57 sheets of paper in the system formamide/cyclohexane-benzene (1:2). The zone of $R_F$=0.38 is extracted in the usual manner and the residue recrystallised from methylene chloride+ether, to yield 35 mg. of the (18→11)-lactone of d:l-$\Delta^4$-3:20-dioxo-11$\beta$-hydroxy-16:17$\alpha$-epoxy-pregnene-18-acid described in Example 11. The zone of $R_F$=0.48 yields 45 mg. of d:l-$\Delta^4$-3:20-dioxo-11$\beta$-hydroxy-16:17$\alpha$-oxido-18-acetoxy-pregene which, after recrystallisation from methylene chloride+ether, melts at 196–197° C. The infra-red spectrum in methylene chloride displays inter alia characteristic bands at 2.90$\mu$ (hydroxyl); 5.77$\mu$ and 8.14$\mu$ (acetate); 5.89$\mu$ (20-ketone); 5.98$\mu$ and 6.16$\mu$ ($\Delta^4$-3-ketone).

The mother liquor from the 116.3 mg. of crystals obtained above is chromatographed in the system formamide/benzene+chloroform (1:1) on 47 sheets of paper, and from the zone $R_F$=0.3 there are obtained, after the usual extraction and recrystallisation of the eluate from methylene chloride+ether, 7.7 mg. of the d:l-$\Delta^4$-3:20-dioxo-11$\beta$:17$\alpha$-dihydroxy-18-acetoxy-pregnene described in Example 8. After having been recrystallised from methylene chloride+ether, the compound melts at 175.5–176.5° C. and its infra-red spectrum in methylene chloride contains inter alia bands at 2.78$\mu$ and 2.88$\mu$ (hydroxy); 5.75$\mu$ and 8.15$\mu$ (acetate); 5.85$\mu$ (20-ketone); 5.99$\mu$ and 6.17$\mu$ ($\Delta^4$-3-ketone).

Example 10

1.5 grams of the crude crystallisate obtained by oxidation described in Example 7 of d:l-$\Delta^5$-3:20-(bis-ethylenedioxy)-11$\beta$:17$\alpha$:18-trihydroxy-pregnene with aluminium-tertiary butylate and cyclohexanone, are heated with 85 cc. of glacial acetic acid and 13 cc. of water under nitrogen for 15 minutes in a bath heated at 130° C. The mixture is then cooled with ice, evaporated in vacuo, the residue is dissolved in benzene, the solution again evaporated in vacuo, and this operation is repeated until the smell of glacial acetic acid has disappeared. The reaction mixture is resolved in the usual manner on 500 sheets of paper in the system formamide/benzene+chloroform (1:1), zones being obtained which have the $R_F$ values 0.2, 0.45, 0.57 and 0.9. From the zone of $R_F$=0.2 the compound described in Example 7, melting at 221.5–222.5° C., is eluted, whereas the zone of $R_F$=0.45, after the usual extraction, yields the d:l-$\Delta^4$-3:11:20-trioxo-17$\alpha$-18-dihydroxy-pregnene described in Example 7. The zone of $R_F$=0.9 contains a mixture of compounds formed by the ketal cleavage of the unoxidised d:l-$\Delta^5$-3:20-(bis-ethylenedioxy)-11$\beta$:17$\alpha$:18-trihydroxy-pregnene. Extraction of the zone of $R_F$=0.57 and recrystallisation of the eluate from methylene chloride+ether yields 220 mg. of a crystallisate which contains, in addition to the d:l-$\Delta^4$-3:11-dioxo-17$\alpha$:18-dihydroxy-20-ethylenedioxy-pregnene described in Example 7, the cyclohemiacetal of d:l-11$\beta$:17$\alpha$-dihydroxy-18-oxo-progesterone. This mixture is heated with 16.2 cc. of glacial acetic acid and 2.4 cc. of water for 20 minutes under nitrogen in a bath maintained at 130° C., then evaporated in vacuo as described above and chromatographed on 70 sheets of paper in the system formamide/benzene+chloroform (1:1), whereby two zones of $R_F$=0.4 and 0.5 respectively are obtained. The zone of $R_F$=0.4 yields after the usual extraction and recrystallisation of the eluate from methylene chloride+ether, another 90 mg. of d:l-$\Delta^4$-3:11:20-trioxo-17$\alpha$-18-dihydroxy-pregnene; the zone of $R_F$=0.5 yields 45 mg. of practically pure cyclo-hemiacetal of d:l-11$\beta$:17$\alpha$-dihydroxy-18-oxo-progesterone.

A solution of 22 mg. of the resulting cyclohemiacetal of d:l-11$\beta$:17$\alpha$-dihydroxy-18-oxo-progesterone in 2.5 cc. of chloroform is treated while being cooled with ice, with 300 mg. of manganese dioxide and the mixture is stirred for 25 hours at room temperature, then filtered through Celite, washed on the filter with 150 cc. of hot chloroform, and the filtrate is evaporated in vacuo. The residue, recrystallised twice from acetone+ether, yields 5.15 mg. of the (18→11)-lactone of d:l-$\Delta^4$-3:20-dioxo-11$\beta$:17$\alpha$-dihydroxy-pregnene-18-acid melting at 262–263° C. Infra-red spectrum in methylene chloride: bands at 2.80$\mu$ (broad, hydroxy); 5.64$\mu$ ($\gamma$-lactone); 5.88$\mu$ with inflexion at 5.82$\mu$ (weak, 20-ketone); 5.97$\mu$ and 6.17$\mu$ ($\Delta^4$-3-ketone).

From a solution of 20 mg. of the (18→11)-lactone of d:l-$\Delta^4$-3:20-dioxo-11$\beta$:17$\alpha$-dihydroxy-pregnene-18-acid and 2.7 mg. of para-toluenesulfonic acid in 4.5 cc. of ethylene glycol, 1.5 cc. of ethylene glycol are distilled off under nitrogen at a bath temperature of 130° C. and under a pressure of 11 mm. in the course of 50 minutes. The reaction mixture is cooled, treated with dilute sodium bicarbonate solution containing sodium chloride and extracted three times by shaking with benzene, and the organic solutions are washed twice with water, dried, and evaporated in vacuo. The crystalline residue is dissolved in 5 cc. of absolute tetrahydrofuran and treated, while being cooled with ice and stirred, under nitrogen with 20 mg. of lithium-aluminium hydride, the mixture is stirred for 4 hours at room temperature and, while being cooled with ice, treated with a mixture of 0.5 cc. of ethyl acetate and 1 cc. of benzene and then with dilute Rochelle salt solution, extracted three times with chloroform, and the organic solutions are washed with dilute Rochelle salt solution and water. The paper-chromatographic analysis in the system formamide/benzene reveals that the crystalline residue of the dried and evaporated chloroformic solutions consists mainly of the d:l-Δ⁵-3:20-(bis-ethylenedioxy)-11β:17α:18 - trihydroxy-pregnene described in Example 7.

*Example 11*

200 mg. of the (18→11)-lactone of d:l-Δ⁵-3-ethylenedioxy-11β-hydroxy-16:17α-oxido-20-oxo-pregnene-18-acid described in Example 7 are dissolved in 10 cc. of glacial acetic acid, 10 cc. of water are added, and the mixture is heated for 25 minutes at 100° C. The solution is then concentrated in a water-jet vacuum to about 5 cc. diluted with methylene chloride and washed with dilute sodium bicarbonate solution and then with water until neutral, each aqueous solution being additionally extracted once with methylene chloride. The methylene chloride solutions are dried and evaporated and the residue (179 mg.) is recrystallised from methylene chloride+ether, to yield 170 mg. of the (18→11)-lactone of d:l-Δ⁴-3:20-dioxo-11β-hydroxy-16:17α-oxido-pregnene-18-acid in heavy crystals which sublime above 220° C. and melt at 263–265° C. Ultra-violet spectrum is refined alcohol: Maximum at 238 mμ (ε=16750). Infra-red spectrum in methylene chloride: bands at 5.64μ (γ-lactone); 5.84μ (20-ketone); 5.98μ and 6.18μ (Δ⁴-3-ketone).

150 mg. of the (18→11)-lactone of d:l-Δ⁴-3:20-dioxo-11β-hydroxy-16:17α-oxido-pregnene-18-acid are dissolved in a mixture of 2.0 cc. of methylene chloride and 1.0 cc. of glacial acetic acid, treated with 1 cc. of a 36% solution of hydrogen bromide in glacial acetic acid and kept at room temperature. Gradually, red crystals separate out. After 7 hours, the whole is diluted with methylene chloride, the solution washed three times with water, and the aqueous solutions additionally extracted twice with methylene chloride. The moist methylene chloride extracts are combined and evaporated at room temperature in a water-jet vacuum, to yield 241 mg. of a residue which crystallises on addition of a small amount of ether. A sample of the bromohydrin, recrystallised from methylene chloride+methanol at room temperature, melts on being rapidly heated at 253–255° C. (with decomposition).

The crude bromohydrin (236 mg.) is dissolved in a mixture of 36 cc. of dioxane, 20 cc. of methylene chloride and 10 cc. of methanol and added to a suspension of about 3 grams of deactivated Raney nickel in 24 cc. of acetone, to which have been added 0.5 cc. of glacial acetic acid and 2.4 cc. of water. The mixture is refluxed for 4 hours at a bath temperature of 100° C., then filtered while still hot, and the residue is washed on the filter with methylene chloride, concentrated in a water-jet vacuum to about 2 cc., taken up in methylene chloride and washed with dilute sodium bicarbonate solution and then with water until neutral. The paper-chromatographic examination of the evaporation residue of the dried methylene chloride extracts reveals that the crude product is free from starting material and consists of at least five different compounds. The three main products, which absorb in the ultra-violet spectrum, display in the system formamide/benzene $R_F$ values of 0.17, 0.50 and 0.67. The crude product is subjected to preparative chromatography on 98 sheets of filter paper which are then dried in air and the zone of $R_F$=0.17 is cut out, disintegrated and pasted four times with 250 cc. each time of 20% tetrahydrofuran, once each with 250 cc. of 50%, 80% aqueous tetrahydrofuran and finally once with 250 cc. of undiluted tetrahydrofuran and each time suction-filtered while being squeezed. The collected filtrate is then freed from tetrahydrofuran under nitrogen in a water-jet vacuum. Finally, the whole is extracted several times with methylene chloride, the extracts are washed with water, dried, and evaporated. The residue is crystallised from methylene chloride+ether to yield 42 mg. of the (18→11)-lactone of d:l-Δ⁴-3:20-dioxo-11β:17α-dihydroxy-pregnene-18-acid, described in Example 10, in the form of hexagonal flakes.

What is claimed is:

1. Process for the manufacture of 11:18-dioxygenated androstane compounds, wherein a member selected from the group consisting of an 11:18-dioxygenated 17α:20-dihydroxy-pregnane and a derivative thereof unsaturated in the ring system is subjected to the action of a glycol-splitting agent selected from the group consisting of lead tetraacylate, periodic acid, a periodate and manganese dioxide.

2. A compound of the formula

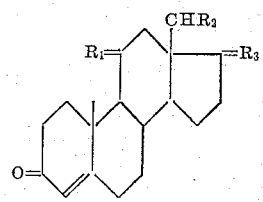

in which $R_1$, $R_2$ and $R_3$ each represent a member selected from the group consisting of a hydrogen atom together with a member selected from the group consisting of a free and an acylated β-hydroxyl group.

3. A compound of the formula

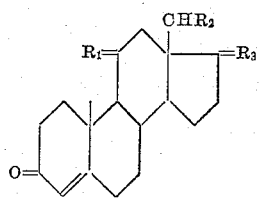

in which $R_1$ and one of the groups $R_2$ and $R_3$ represents a member selected from the group consisting of a hydrogen atom together with a member selected from the group consisting of a free and acylated β-hydroxyl group and the other of the groups $R_2$ and $R_3$ represents an oxo group.

4. A compound of the formula

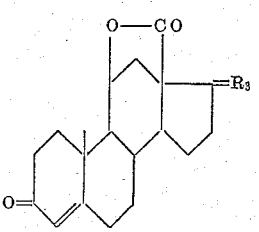

wherein $R_3$ represents a member selected from the group consisting of a hydrogen atom together with a member selected from the group consisting of a free and an acylated β-hydroxyl group and an oxo group.

5. 11β:18-dihydroxy-testosterone.

6. A member selected from the group consisting of the (18→11)-lactone of 11β-hydroxy-testosterone-18-acid and the 17-acetate thereof.

7. A member selected from the group consisting of 11:18-dioxo-testosterone and the 17-acetate thereof.

8. A member selected from the group consisting of 18-hydroxy-adrenosterone and the 18-acetate thereof.

9. A member selected from the group consisting of Δ⁵ - 3 - ethylenedioxy - 11β:17β:18-trihydroxy-androstene and the 18-acetate thereof.

10. A member selected from the group consisting of Δ⁵ - 3 - ethylenedioxy - 11β:18 - dihydroxy - 17 - tetrahydropyanyloxy-androstene and the 18-acetate thereof.

11. A member selected from the group consisting of Δ⁵ - 3 - ethylenedioxy - 11β:18 - dihydroxy - 17 - oxoandrostene and the 18-acetate thereof.

12. A member selected from the group consisting of 11:17:18-trioxygenated pregnenes of the formula

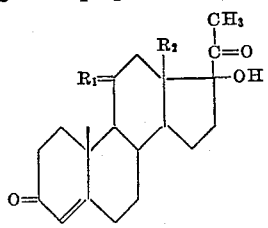

in which formula $R_1$ represents a member selected from the group consisting of a hydrogen atom together with a member selected from the group consisting of a free and an acylated β-hydroxyl group and an oxo group, and $R_2$ a member selected from the group consisting of a free and an acylated carbinol, an aldehyde and an 18 lactonized carboxyl group, and their ethylene ketals.

13. A member selected from the group consisting of $\Delta^4$ - 3 - oxo - 11β:17α:18:20 - tetrahydroxy - pregnene and the $\Delta^5$-3-ethylene ketal thereof.

14. $\Delta^4$-3:20-dioxo-11β:17α:18-trihydroxy-pregnene.

15. $\Delta^4$-3:11:20-trioxo-17α:18-dihydroxy-pregnene.

16. The (18→11)-lactone of $\Delta^4$-3:20-dioxo-11β:17α-dihydroxy-pregnene-18-acid.

17. The (18→11)-lactone of $\Delta^4$-3:20-dioxo-11β:17α-dihydroxy-16β-bromo-pregnene-18-acid.

18. $\Delta^4$-3:17-dioxo-11β-hydroxy-18-nor-androstene.

19. A member selected from the group consisting of 11β-hydroxy-18-oxo-testosterone, its 11:18-semi-acetal and the 17:18-diacetate of the latter.

20. A compound selected from the group consisting of $\Delta^4$ - 3:18:20 - trioxo - 11β:17α - dihydroxy - pregnene and the 18:11 semi-acetal thereof.

No references cited.